United States Patent [19]

Petrovic

[11] Patent Number: 5,669,178
[45] Date of Patent: Sep. 23, 1997

[54] AUTOMATIC CHRISTMAS TREE WATERER

[76] Inventor: William J. Petrovic, 2115 N. Winchester, Chicago, Ill. 60614

[21] Appl. No.: 675,192

[22] Filed: Jul. 3, 1996

[51] Int. Cl.⁶ ........................................ A47G 7/02
[52] U.S. Cl. ............................... 47/40.5; 248/527
[58] Field of Search ...................... 47/40.5, 79 V; 248/527

[56] References Cited

U.S. PATENT DOCUMENTS

| | | | |
|---|---|---|---|
| 1,160,698 | 11/1915 | Diederichs | 47/40.5 |
| 1,846,891 | 2/1932 | Miller | 47/40.5 |
| 3,697,026 | 10/1972 | Hambrick | 248/524 |
| 4,034,505 | 7/1977 | Lydall | 47/40.5 |
| 5,009,028 | 4/1991 | Lorenzana et al. | 248/524 |
| 5,349,997 | 9/1994 | Rial | 248/524 |
| 5,410,839 | 5/1995 | Granger | 248/524 |

FOREIGN PATENT DOCUMENTS

| | | | |
|---|---|---|---|
| 1491390 | 8/1967 | France | 47/79 V |
| 2386985 | 12/1978 | France | 47/40.5 |
| 2650099 | 5/1978 | Germany | 47/79 V |
| 90084 | 8/1957 | Norway | 47/40.5 |

*Primary Examiner*—Henry E. Raduazo
*Attorney, Agent, or Firm*—Patent & Trademark Services; Joseph H. McGlynn

[57] ABSTRACT

An improved watering device for Christmas trees which has a hollow cylindrical base and has an elevated cylindrical opening for supporting a tree and clamps for tightening the base of the tree therein. A cradle for supporting a water bottle extends upward at the outer edge of the base. Directly below the cradle is a threaded opening for receiving the nozzle of the water bottle. An alternative embodiment provides a support bracket for hanging the water bottle cradle alongside a conventional tree stand, and a modified cap for directing the water to the desired location.

5 Claims, 1 Drawing Sheet

5,669,178

AUTOMATIC CHRISTMAS TREE WATERER

BACKGROUND OF THE INVENTION

The present invention relates generally to watering devices for plants, and particularly to a compact, unobtrusive apparatus that delivers a constant supply of water to Christmas trees.

Description of the Prior Art

Various watering devices for Christmas trees and other plants are known in the prior art. U.S. Pat. Nos. 5,349,997 and 5,410,839 disclose segmented funnel devices for accessing the sometimes hard-to-reach reservoir areas of Christmas tree stands. U.S. Pat. Nos. 3,697,025 and 5,009,028 describe Christmas tree waterers with separate reservoir tanks to maintain a constant supply of water.

The prior art watering devices, however, are typically bulky and unattractive, which is an obvious disadvantage at Christmas time, when everyone enjoys having an attractive tree displayed. This is especially true of the prior art inventions having separate reservoir tanks. The prior art tree waterers are also typically composed of a multitude of parts, which makes them inconvenient and time consuming to use.

There remains a need for a Christmas tree watering device that is capable of maintaining a constant supply of water to the tree without the use of complicated and obtrusive devices that detract from the appearance of the tree.

SUMMARY OF THE INVENTION

The present invention is a Christmas tree watering device, having various embodiments which provide an attractive, simple, and unobtrusive means to maintain a constant supply of water to the tree. In one embodiment, the invention comprises a hollow, cylindrical base with a means for supporting the tree and a cradle thereon which supports a water bottle. The nozzle of the water bottle fits into an opening on the base and is capable of maintaining the proper flow of water to the tree supported therein. In a separate embodiment, the cradle supporting the water bottle is mounted to an armature which is capable of being supported on a conventional Christmas tree stand. The invention is simple and inexpensive to construct, and provides a welcome alternative to the bulky and otherwise undesirable watering devices heretofore disclosed in the prior art.

Accordingly, it is an object of the present invention to provide an improved watering device.

It is a further object of the present invention to provide an improved watering device for Christmas trees that is simple and inexpensive to construct.

It is also an object of the present invention to provide an improved watering device for Christmas trees that is unobtrusive, attractive, and convenient to use.

These and other objects and advantages of the present invention will become more apparent from the detailed description below, when taken in conjunction with the annexed drawings.

DESCRIPTION OF THE PREFERRED EMBODIMENTS

Figure 1:
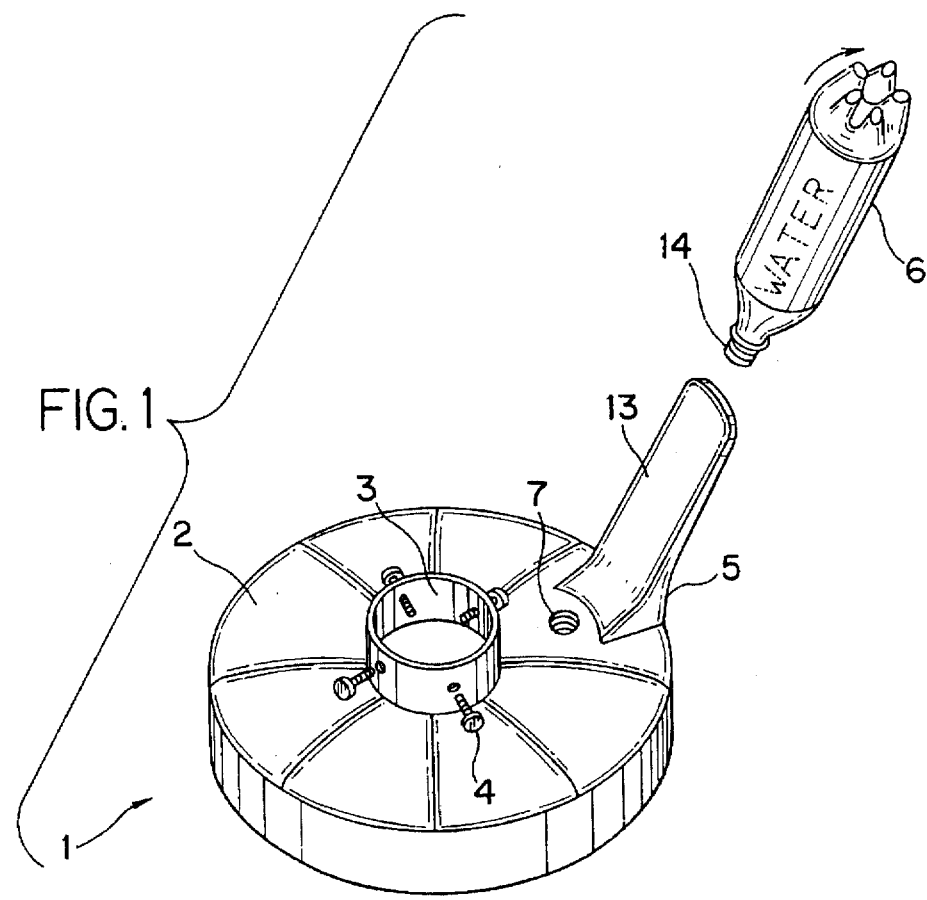
FIG. 1 shows a perspective view of the Christmas tree waterer of the present invention.

Referring now to the drawings in greater detail, it can be seen in FIG. 1 that the embodiment of the invention 1 shown therein comprises a hollow cylindrical tank 2 with an elevated, cylindrical tree support portion 3 extending from its center. Threaded members 4 projecting through the tree support 3 provide the means to secure the base of the tree therein. Although the element 2 is shown as being cylindrical, it should be noted that this is merely for illustration purposes, and any shape may be selected without departing from the scope of the invention.

A water bottle support cradle 5 extends upward from the outer edge of the tank 2 at a slight angle. The cradle 5 has a curved surface 13 to contour closely to the shape of the water bottle 6, so that the bottle is held securely. The tank 2 has a threaded opening 7 directly below the cradle 5 for receiving the nozzle 14 of the water bottle 6.

To use the above described embodiment of the present invention, the base of the Christmas tree (not shown) is placed in the support portion 3 and secured therein by rotating the threaded members 4 until they securely engage the base of the tree, in the conventional manner. The tank 2 is then filled with water through the opening 7. When the tank is 2 full, the water bottle 6 is filled and the nozzle or neck 14 is threaded into the opening 7. The water bottle 6 is retained in the cradle 5 by the slant on the cradle 5 and the weight of the water and the screw connection between the nozzle or neck 14 cooperating with the threads in the opening 7, and delivers water to the tree as the water in the tank 2 is absorbed by the tree.

The above described embodiment of the present invention can be constructed from polyethylene plastic or some similar compound using the process of blow molding. This is an inexpensive process which uses a parison (hollow tube) of plastic, and at minimum a two part mold. The hollow plastic tube (parison) is heat softened and a cavity (within the two part mold) is placed around the tube. The mold pinches off one end of the tube while hot air is blown into the other end of the plastic tube. The tube "blows up" like a balloon against the mold. This means that the blown plastic takes on the shape of the mold (in this case, the tank 2 shown in FIG. 1) it was formed against.

The two part mold is then opened up and the tank 2 ejected and allowed to cool and harden. Second stage cutting and trimming follows to give the part a finished look. Some of the second stage work is performed by hand while other portions may be done by machine depending on the exact nature of the part being worked on.

Most blow molders like to use polyethylene plastic because it has a waxy feel to it and slides well within the mold, although other materials may be used. Textures may be added to the outer surface of a blow molded part, giving the appearance of leather, grainy sand, cross-hatching, etc. Textures such as these would certainly add to the overall quality appearance of the present invention.

Figure 2:
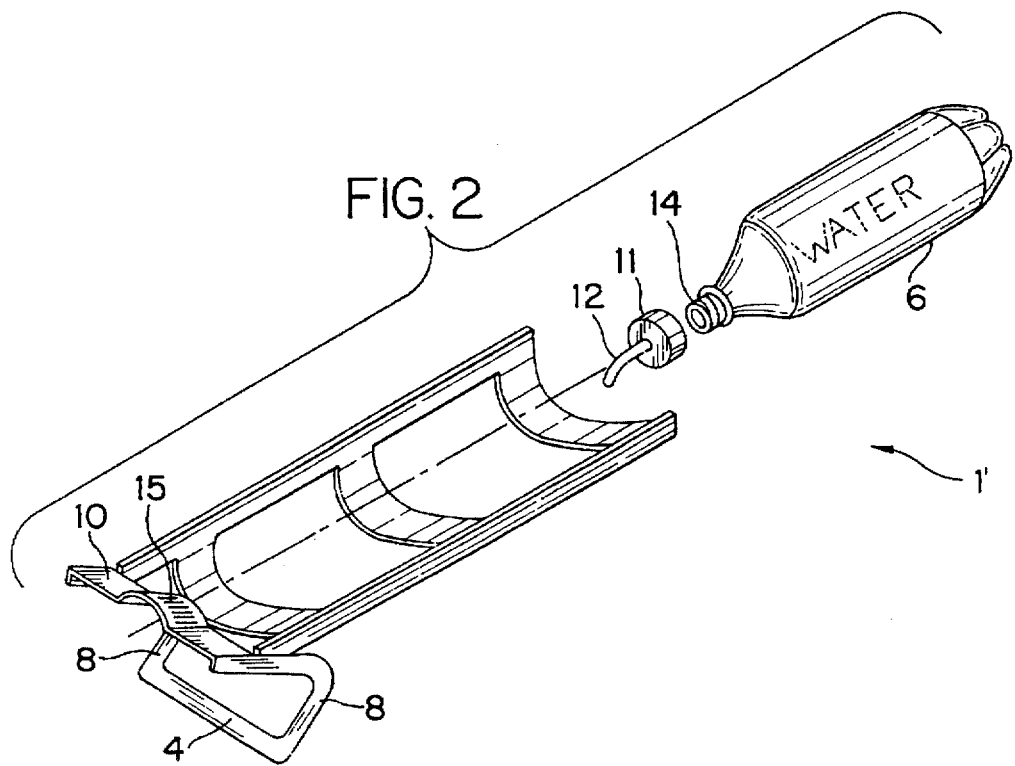
FIG. 2 shows a perspective view of an additional embodiment of the Christmas tree waterer of the present invention.

Depicted in FIG. 2 is a second embodiment of the present invention, designated generally as 1', for use with a conventional Christmas tree base. In this embodiment, the cradle 5' is attached to a support bracket 8, 9. The support bracket consists of two generally V-shaped end portions 8 connected at their lower end by a cross member 9 and at their upper end by a nozzle support member 10. The nozzle support member 10 has a half-circle offset portion 15 to accommodate the nozzle 14 of the bottle 6. Also used in this embodiment is a cap 11 with a short hose 12 fitted through the top thereof, to facilitate proper channeling of the water from the bottle 6 into the conventional tree stand.

To use the embodiment of the invention described immediately above, the support bracket 8 is hung alongside the conventional tree stand. The water bottle 6 is then filled, fitted with the cap 11, which could have screw threads which would cooperate with the threads on the neck 14, or it could have a ridge on the inner portion of the cap 11 which would snap over the threads on the neck 14 to secure the cap to the bottle. Once the cap is on the bottle, it is placed in the cradle 5' such that the bottle nozzle 14 is fitted into the offset portion 15 of the nozzle support 10. The short hose 12 is then directed towards the reservoir portion of the stand, and will deliver water to the tree stand on demand similar to the FIG. 1 device.

The above described embodiment of the present invention could be manufactured using a process known as injection molding. Injection molding is a process in which heat softened plastic material is forced under very high pressure into a metal cavity mold which is relatively cool. Acceptable metals for the mold are aluminum and steel. The inside cavity of the mold is composed of two or more parts, and is the same desired shape as the product to be formed.

High pressure hydraulics are used to keep the mold components together during the actual injection phase of the molding process. The injected plastic is allowed to cool and harden. Then the hydraulics holding the multiple component cavity together are released and the mold is separated and the solid plastic item is removed.

Injection molding can be a highly automated process and is capable of producing extremely detailed parts at a very cost effective price.

The adapter cap 11 can be manufactured in two ways. The first involves modifying a conventional soda bottle cap by drilling or otherwise providing a hole in the cap and adding a rubber tube 12 with a flared portion inside the cap to prevent the tube from being pulled through the cap. The second method is to injection mold the cap and tube as a unitary piece.

Although the Christmas tree waterer and the method of using the same according to the present invention have been described in the foregoing specification with considerable details, it is to be understood that modifications may be made to the invention which do not exceed the scope of the appended claims and modified forms of the present invention done by others skilled in the art to which the invention pertains will be considered infringements of the present invention when those modified forms fall within the claimed scope of this invention.

What I claim as my invention is:

1. A Christmas tree watering apparatus for automatically supplying water to a tree stand comprising:

a container means for holding a supply of water, said container means having a top, and holding means attached to said top for securing a trunk of a tree thereto in an upright position, at least one aperture means formed in said container means for receiving a second container means for holding a supply of water, support means adjacent said aperture means for supporting said second container means, said support means forming an angle with said top that is greater than 90°, and wherein said aperture means has internal screw threads, and said second container means has external screw threads which cooperate with said internal screw threads for holding said second container means in said aperture means.

2. The Christmas tree watering apparatus as claimed in claim 1, wherein said support means has a depression formed on one surface which conforms to an outside of said second container means.

3. The Christmas tree watering apparatus as claimed in claim 1, wherein said support means is unitary with said top.

4. The Christmas tree watering apparatus as claimed in claim 1, wherein said support means is a separate element which has means for attaching to a Christmas tree stand, said attaching means comprises a pair of legs, a first cross member attached at opposite ends to a first end of said pair of legs, a second cross member attached at opposite ends to a second end of said pair of legs, said second cross member having means for supporting said second container means.

5. The Christmas tree watering apparatus as claimed in claim 1, wherein said second container means has a cap attached thereto, and a tube is secured to said cap to allow water to flow from said second container means to said tree stand.

* * * * *